United States Patent
Dangott et al.

(10) Patent No.: US 9,098,852 B1
(45) Date of Patent: Aug. 4, 2015

(54) METHOD AND SYSTEM FOR MONITORING AND DETECTING FRAUD IN TARGETED BENEFITS

(71) Applicant: JPMorgan Chase Bank, N.A., New York, NY (US)

(72) Inventors: Tracy L. Dangott, Chicago, IL (US); Andrew J. Mastrino, Naperville, IL (US); Keith L. Miller, Grafton, WI (US); Jaclyn Radeni, Crystal Lake, IL (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 13/803,471

(22) Filed: Mar. 14, 2013

(51) Int. Cl.
*G06Q 20/40* (2012.01)

(52) U.S. Cl.
CPC .................................... *G06Q 20/409* (2013.01)

(58) Field of Classification Search
CPC ............................. G06Q 20/409; G06Q 20/40
USPC .............................. 705/4, 35, 39, 44; 235/380
See application file for complete search history.

(56) References Cited

U.S. PATENT DOCUMENTS

| | | | |
|---|---|---|---|
| 5,224,173 A | 6/1993 | Kuhns | |
| 5,253,164 A | 10/1993 | Holloway et al. | |
| 5,457,747 A | 10/1995 | Drexler et al. | |
| 5,469,506 A | 11/1995 | Berson et al. | |
| 5,536,045 A | 7/1996 | Adams | |
| 5,553,155 A | 9/1996 | Kuhns et al. | |
| 5,822,741 A | 10/1998 | Fischthal | |
| 6,820,059 B2 * | 11/2004 | Wood et al. | 705/4 |
| 6,873,960 B1 * | 3/2005 | Wood et al. | 705/4 |
| 7,058,585 B1 * | 6/2006 | Wood et al. | 705/4 |
| 7,209,886 B2 | 4/2007 | Kimmel | |
| 7,813,944 B1 | 10/2010 | Luk et al. | |
| 7,877,611 B2 | 1/2011 | Camacho et al. | |
| 8,676,611 B2 | 3/2014 | McLaughlin et al. | |
| 2002/0005774 A1 | 1/2002 | Rudolph et al. | |
| 2004/0204951 A1 * | 10/2004 | Wood et al. | 705/1 |
| 2004/0204960 A1 * | 10/2004 | Wood et al. | 705/2 |
| 2006/0179063 A1 * | 8/2006 | Rose et al. | 707/10 |
| 2006/0184801 A1 * | 8/2006 | Wood et al. | 713/186 |
| 2008/0040275 A1 | 2/2008 | Paulsen et al. | |
| 2012/0239557 A1 | 9/2012 | Weinflash et al. | |
| 2013/0024300 A1 | 1/2013 | Choudhuri | |

OTHER PUBLICATIONS

Jain, Anil, Lin Hong, and Sharath Pankanti. "Biometric Identification." Communications of the ACM 43.2 (2000): 91.

* cited by examiner

*Primary Examiner* — Daniel Felten
(74) *Attorney, Agent, or Firm* — Hunton & Williams LLP

(57) ABSTRACT

According to an embodiment of the present invention, a computer implemented method and system for identifying potential fraud with targeted benefits comprising: receiving, using a programmed computer processor, participant data associated with a participant of a targeted benefit program wherein the participant data comprises geographical data associated with the participant and a participating merchant; applying, using a programmed computer processor, data linking to the participant data where a plurality of filters are applied to the participant data to identify potential fraud; and providing an output, via an interface, comprising a recommended response to the identified potential fraud.

22 Claims, 5 Drawing Sheets

METHOD AND SYSTEM FOR MONITORING AND DETECTING FRAUD IN TARGETED BENEFITS

FIELD OF THE INVENTION

The present invention relates generally to detecting, monitoring and investigating fraudulent activity, and more specifically to identifying potential fraud in transactions involving targeted benefits.

BACKGROUND OF THE INVENTION

Fraud detection is typically a manual process that involves culling through transactions to find fraud patterns. It is not an exact science and oftentimes good customers are identified as potential fraudsters. Fraud affects many types of transactions, including transactions involving targeted benefits. Targeted benefit programs provide a way for qualifying individuals to receive subsidies to purchase certain goods and services. Fraud may occur in the form of benefit trafficking, which may involve two participants who are in agreement, such as a willing merchant to purchase the benefit for cash and a willing customer authorized to redeem the benefit. Because there is no victim, this type of trafficking is particularly more difficult to detect and thus more difficult to thwart. In the field of targeted benefits, it is also difficult to determine an appropriate course of action because complete denial of benefits, even to a fraudster, is discouraged. It is estimated that millions of dollars are used for improper purchases, thereby defeating the goal and purpose of many benefit programs.

Other drawbacks may also be present.

SUMMARY OF THE INVENTION

Accordingly, one aspect of the invention is to address one or more of the drawbacks set forth above. According to an embodiment of the present invention, a method for detecting, monitoring, investigating and identifying potential fraud with targeted benefits comprises the steps of: receiving, using a programmed computer processor, participant data associated with a participant of a targeted benefit program wherein the participant data comprises geographical data associated with the participant and a participating merchant; applying, using a programmed computer processor, data linking to the participant data where a plurality of filters are applied to the participant data to identify potential fraud; and providing an output, via an interface, comprising a recommended response to the identified potential fraud.

According to an exemplary embodiment of the present invention, an automated computer implemented method and system identifies potential fraud with targeted benefits wherein the geographical data further comprises travel distance between an address associated with the participant and the participating merchant; wherein the participant data further comprises transaction data from one or more merchants; wherein the output comprises a user defined report; wherein the participant data is retrieved from a card product issued to the participant; wherein the plurality of filters comprise a combination of filters associated with participant data, merchant data and transaction data; wherein the participant data comprises reconciliation data to confirm purchases made by the participant; wherein the targeted benefit program restricts redemptions to a class of eligible purchases at one or more eligible merchants; and wherein the targeted benefit program is directed to eligible services; wherein the participant comprises one or more of a cardholder and a merchant; and wherein one filter of the plurality of filters comprises a performing user identifier.

According to an exemplary embodiment of the present invention, a computer implemented system for identifying potential fraud with targeted benefits comprises an input, comprising a programmed computer processor, configured to receive participant data associated with a participant of a targeted benefit program wherein the participant data comprises geographical data associated with the participant and a participating merchant; a data linking engine, comprising a programmed computer processor, configured to apply data linking to the participant data where a plurality of filters are applied to the participant data to identify potential fraud; and an output, comprising a computer interface, configured to provide an output comprising a recommended response to the identified potential fraud.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

DETAILED DESCRIPTION OF EXEMPLARY EMBODIMENT(S)

Figure 1:
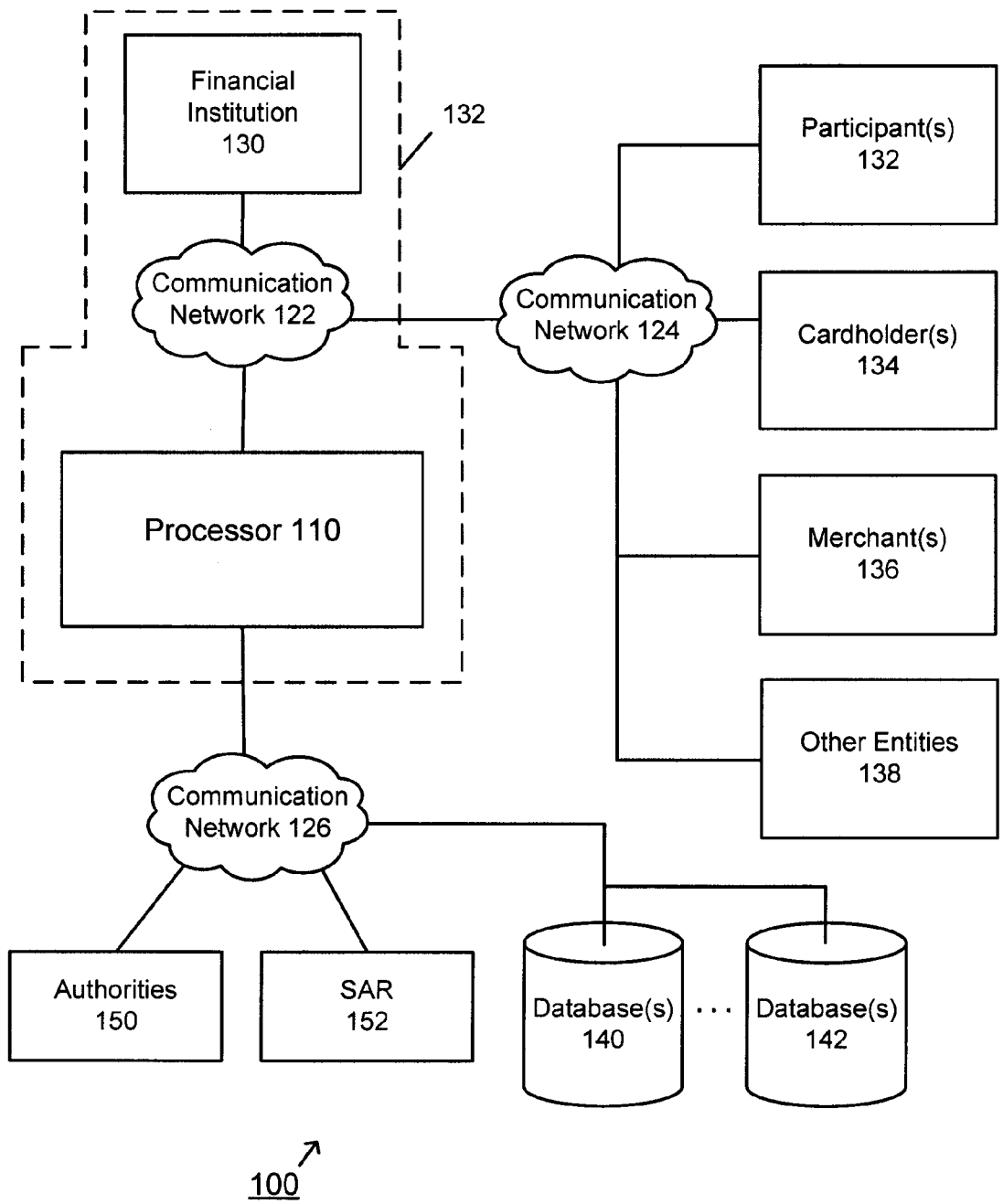
FIG. 1 is an exemplary diagram of a system for monitoring and detecting fraud with targeted benefits, according to an embodiment of the present invention.

An embodiment of the present invention provides a mechanism to accurately identify fraudulent activity in targeted benefit programs and remove participants and merchants from the program that engage in trafficking. Many targeted benefit programs now issue debit cards to authorized participants to facilitate the redemption of benefits. For example, a participant may use a debit card to make authorized purchases of groceries at a qualifying merchant, rather than presenting a paper voucher. Other payment mechanisms may be used with targeted benefit programs, such payment mechanisms may include a token, identifier and PIN combination, RFID, mobile device, etc.

An embodiment of the present invention may identify potential fraudulent activities by analyzing data and applying dynamic linking. For example, the system may create links within the transactions and with other factors/data to identify anomalies and trends that provide directional information in fraud identification. An embodiment of the present invention may involve transactions that are paid with targeted benefits. Targeted benefits may include any benefit type with a targeted and/or restricted use. For example, an exemplary application may be directed to detecting fraud in Supplemental Nutrition Assistance Program ("SNAP"), formerly known as the Food Stamp Program. SNAP provides financial assistance for purchasing food to low income individuals and families. Under SNAP, benefits may be used to purchase food from approved sources, e.g., grocery stores, but not fast food restaurants and similar retail settings. Most states now allow a specialized debit card system known as Electronic Benefit Transfer (EBT), instead of traditional coupons or vouchers.

Other programs may include WIC and TANF. The Special Supplemental Nutrition Program for Women, Infants and Children (WIC) is a federal assistance program of the Food and Nutrition Service (FNS) of the United States Department of Agriculture (USDA) for healthcare and nutrition of low-income pregnant women, breastfeeding women, and infants and children under the age of five. Temporary Assistance for Needy Families (TANF) is a federal assistance program which provides cash assistance to indigent American families with dependent children through the United States Department of Health and Human Services. This cash benefit is often referred to simply as "welfare." The Act provides temporary financial assistance while aiming to get people off of that assistance, primarily through employment. States also have the authority to eliminate payments to recipients altogether.

Targeted benefits may also include vouchers for services and/or goods. For example, many states offer taxi vouchers for the elderly and other qualifying individuals. Such a program is designed to provide low to moderate income residents with a low cost transportation option. Many jurisdictions appropriate the funds necessary to continue the city's subsidized taxi service. Under such programs, income eligible citizens may purchase a card redeemable by participating taxi cab companies for one taxi ride within the city limits. Participants may pay a portion of the fee or none at all, depending on the program and/or qualifications.

Other targeted benefits may include vouchers that are valid at certain merchants, vendors and/or types of service providers. An embodiment of the present invention may also apply to specific types of transactions, such as medical purchases or payments, where such vouchers or benefits may be restricted for medical services. For example, an embodiment of the present invention may be applied to detect insurance fraud and/or other types of fraud. Other restrictions and/or qualifications may be applied.

An embodiment of the present invention may be directed to accurately identifying potential areas of fraud, such as trafficking within the context of targeted benefit. A typical trafficking scenario may involve selling a benefit to a retailer for cash. For example, a participant may sell a $100 benefit for $50 in cash and then use the $50 for unauthorized and even unlawful purchases. Trafficking diverts benefits from their intended purpose of helping low-income families access healthy meals. An embodiment of the present invention provides a mechanism for identifying trafficking by using participant data, merchant data, transaction/purchase data and geographical data to identify suspicious transaction patterns and further alert and collaborate with authorities as well as other investigative agencies.

An embodiment of the present invention may use a data-mining tool to isolate possible participants and merchants who are participating in fraud, such as trafficking. A system of the present invention provides an interface that allows users to select a report with a number of data elements and conditions to yield an output of data that provides direction information towards fraudulent activity. Trafficking is one example of fraud, as other forms of fraud may be used in connection with targeted benefits, vouchers and/or other payment instruments.

A feature of the system may be directed to applying geographical data to the data-mining tool. Exemplary data elements may include geographical location of the participant's address (e.g., latitude/longitude coordinates of participant's address). Other locations may include family member's home, school, daycare, gym, religious establishment, government entity, employment, etc. Also, a regular commute or course of travel may be considered. Other examples may include geographical location of the merchant (e.g., latitude/longitude coordinates of merchant address). Other examples may include distance of a transaction (e.g., driving distance between where the participant lives and where the participant shopped).

An embodiment of the present invention may dynamically filter data to identify trends and patterns that may lead to identifying potential fraud. For example, a fraudulent participant may have an agreement with a fraudulent merchant to sell benefits at a reduced value for cash. To get to this merchant, the participant travels over 20 miles and passes by four participating merchants. Using the geographical information, the system of the present invention may identify every participant that shopped over 15 miles from their home. This type of behavior may have less significance if the participant makes legitimate stops along the way, e.g., gas station, day care, unemployment office, government entity, etc. However, if the participant's home and other points of interest are in an opposite direction and the participant also passes by a number of participating (known legitimate) merchants, an embodiment of the present invention may recognize that this type of behavior is indicative of potential fraud. This geographical information—combined with other data—may identify participant behavior that may lead to potentially fraudulent activities.

Other data may relate to (1) participant; (2) merchant and (3) transaction. For example, participant data may include participant behavior data (e.g., pass X number of big box stores to redeem at a particular merchant; request new card and PIN number; other card use; etc.), neighborhood data, proximity to known fraud, demographic data, prior history, etc. Merchant data may include type of merchant (e.g., convenient store—small, medium, large), transaction amount, frequency and number of redemptions, historical data, neighborhood data, proximity to known fraud, prior fraudulent activities, etc. According to another example, transaction data may include amount of redemption, percentage of total redemption (e.g., redeem 100% of benefits at one transaction, etc.); even amount, odd amount, same amount, number of transactions within a certain time frame, etc.

Using various combinations of data, an embodiment of the present invention may generate a report or profile for the participant, merchant, group of participants (e.g., by age, location, demographic) and group of merchants (e.g., by size, location, type), etc. The system may also identify trends, predict next steps and learn patterns from known fraud as well as false positives. This is particularly useful when learning new tactics from fraudsters who are constantly trying to outsmart the current system.

While the detailed description is directed to an exemplary application involving identify fraud in targeted benefits, the various embodiments of the invention may be applied to other scenarios and applications involving other fraudulent activities or other activities involving cluster data. Other applications may be applied in varying scope.

FIG. 1 is an exemplary diagram of a system for monitoring and/or identifying potential fraud associated with targeted benefits, according to an embodiment of the present invention. A system 100 of an embodiment of the present invention may include a Processor 110, which may be stand alone, hosted by an entity, such as a financial institution, service provider, bank, etc. For example, Processor 110 may be affiliated or associated with a financial institution, bank and/or other entity with fraud concerns. In an exemplary embodiment involving a financial institution such as 130, the financial institution may host or support the Processor 110. In this example, the application of the various features of an embodiment of the present invention may appear to be performed by financial institution, as a single consolidated unit, as shown by 132.

According to another example, Processor 110 may be separate and distinct from Financial Institution 130. For example, Financial Institution 130, or other entity, may communicate to Processor 110 via a network or other communication mechanism, as shown by 122. While a single illustrative block, module or component is shown, these illustrative blocks, modules or components may be multiplied for various applications or different application environments. In addition, the modules or components may be further combined into a consolidated unit. Other architectures may be realized. The modules and/or components may be further duplicated, combined and/or separated across multiple systems at local and/or remote locations.

Processor 110 may access databases and/or other sources of information to identify fraud situations and/or other relevant information for effectively identifying fraudulent and potentially fraudulent events. For example, Processor 110 may access and/or maintain Databases 140, 142. Databases 140 and 142 may include data, such as participant profile data, merchant profile data, geographical data, transaction activity, redemption activity and/or other relevant data for one or more accounts. While each database is illustrated as a single database in the exemplary figure, the system may include multiple databases at the same location or separated through multiple locations. The databases may be further combined and/or separated. In addition, the databases may be supported by Financial Institution 130 or an independent service provider. For example, an independent service provider may support the one or more databases and/or other functionality at a remote location. Other architectures may be realized. The components of the exemplary system diagrams may be duplicated, combined, separated and/or otherwise modified, as desired by various applications of the embodiments of the present invention as well as different environments and platforms.

Processor 110 may communicate with various entities, including Participant(s) 132, Cardholder(s) 134, Merchant(s) 136, and/or Other Entities 138. Cardholders may include participants that use a card product, e.g., debit card, to make qualifying purchases in accordance with a targeted benefit program. An embodiment of the present invention may also communicate to Authorities 150, including police, law enforcement, FBI, terrorism bureaus, government entities and/or other entities. In addition, suspicious activity report (SAR) filings may be facilitated through an embodiment of the present invention, as shown by 152. Communication may be provided by Communication Network 122, 124, 126 and/or other communication mechanism. In addition, Processor 110 may have access to other sources of data and/or data feeds that identify other metrics and/or information that may be relevant for identifying fraud activities in accordance with an embodiment of the present invention.

Figure 2:
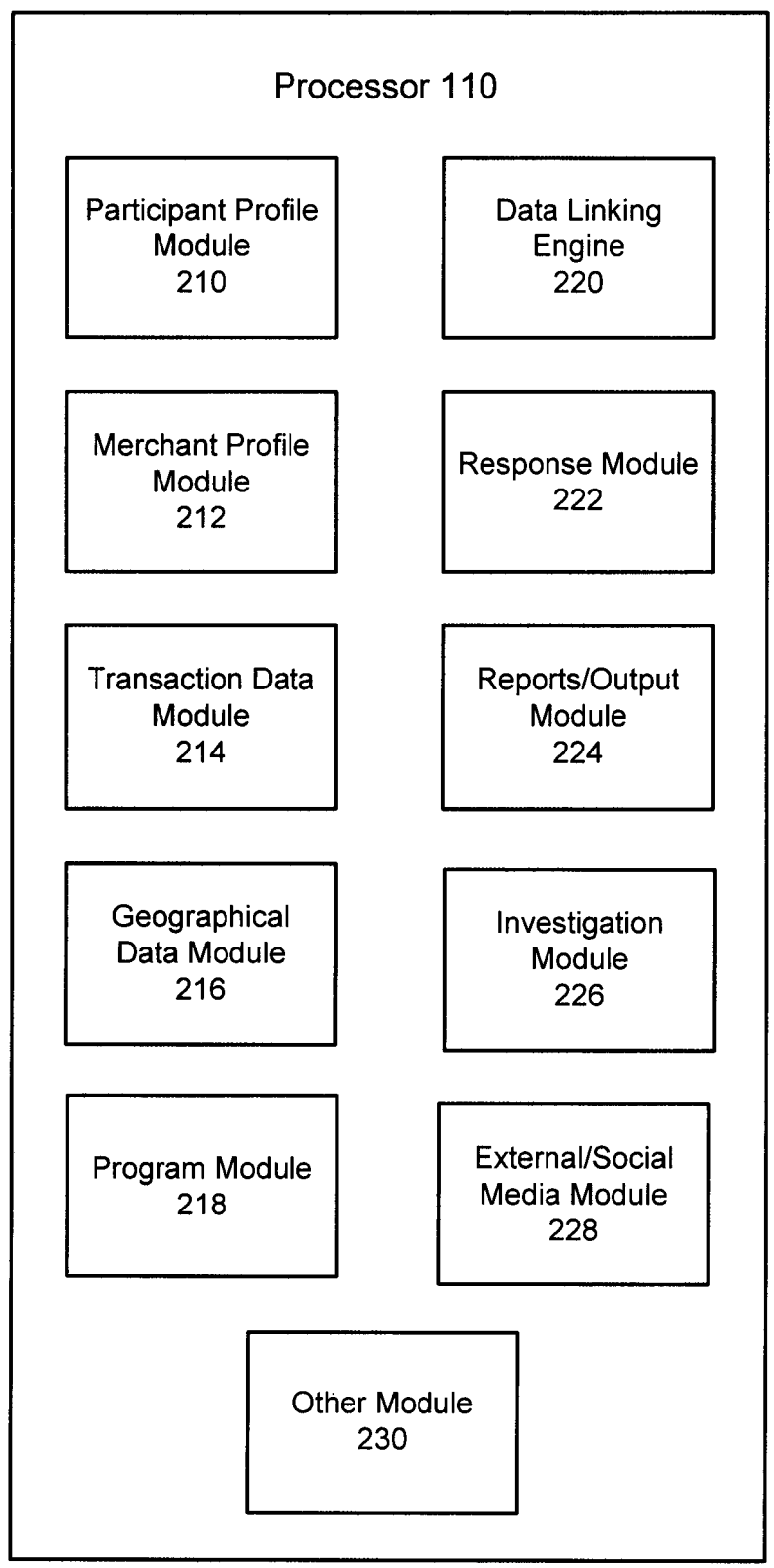
FIG. 2 is an exemplary detailed diagram of a processor for monitoring and detecting fraud with targeted benefits, according to an embodiment of the present invention.

FIG. 2 is an exemplary detailed diagram of a processor for monitoring and/or detecting potential fraud for targeted benefits, according to an embodiment of the present invention. For example, Processor 110 may include various modules and interfaces for analyzing data and identifying fraudulent and potentially fraudulent events, according to an embodiment of the present invention. Processor 110 may include Participant Profile Module 210, Merchant Profile Module 212, Transaction Data Module 214, Geographical Data Module 216, Program Module 218, Data Linking Engine 220, Response Module 222, Reports/Output Module 224, Investigation Module 226, Social Media Module 228, External Source 230 and/or other modules, interfaces and/or processors, as represented by Other Module 260. While a single illustrative block, module or component is shown, these illustrative blocks, modules or components may be multiplied for various applications or different application environments. In addition, the modules or components may be further combined into a consolidated unit. Other architectures may be realized. The modules and/or components may be further duplicated, combined and/or separated across multiple systems at local and/or remote locations.

According to another embodiment of the present invention, Processor 110 may host a website or other electronic interface or other input where users can access data as well as provide data. For example, a financial institution, merchant and/or other entity may access information through an interface to view data, submit requests, view reports, provide data and/or perform other actions. In addition, an application for a mobile device may be provided for the participant. The application may enable the participant to make qualifying purchases using a mobile device. The application may also provide a reconciliation feature to verify purchases. Verification may be accomplished by a camera function, scanner, etc.

Participant Profile Module 210 may generate a participant profile for each participant or group of participants. The participant profile may be generated and/or updated using data from the participant and/or other inputs and external sources of data. For example, a participant may provide profile data, such as demographic data, purchase habit data, etc. According to another example, an embodiment of the present invention may automatically build and update a participant profile based on transaction data, geographic data, behavior data, information available on social media, public websites and/or other sources of data. The system may also automatically generate and/or update profile data using internal transactional data and/or other participant specific data. Profile information may also include participant behavior data (e.g., pass X number of big box stores to redeem at a particular merchant; request new card and PIN number; other card use; etc.), neighborhood data, proximity to known fraud, demographic data, prior history, frequency of redemption, other transactions, authorized and unauthorized users and family members, etc. Other examples may include cardholder access type, access type description, card expiration date, card issue date, card number, cardholder date of birth, cardholder full address, cardholder full name, cardholder indicator, cardholder phone number, cardholder service site, cardholder service site description, state code, state unique identifier and/or other data.

Merchant Profile Module 212 may generate a Merchant profile for each participating merchant or type of merchant. The merchant profile may be generated using merchant provided data, data from various sources, transactional data and/or merchant specific data. Merchant data may include type of merchant (e.g., convenient store—small, medium, large), frequency of redemptions, number of redemptions, historical data, neighborhood data, proximity to known fraud, prior fraudulent activities, etc. Most national retailers may have multiple locations. In this case, each location may have an individual merchant profile. Merchant profile data may also include complaints from customers, incidents of fraud and/or potential fraud, etc. For example, while a characteristic may not seem indicative of fraud, numerous instances of the same, related or similar characteristic may have more weight towards potential fraud. An embodiment of the present invention may analyze data to determine such relevant characteristics. Other examples may include merchant detail, acquirer identifier, FNS number, merchant full address, terminal identifier, terminal merchant name and/or other data.

Transaction Data Module 214 may include line item information for transactions. Transaction data may include purchase information, amount of transaction, amount of redemption, percentage of total redemption (e.g., redeem 100% of benefits at one transaction); time and day of transaction (e.g., time and date stamp), location, whether the transaction was an even amount, whether the transaction was an odd amount, occurrence of transactions having the same amount, number of transactions within a certain time frame, etc. According to an exemplary illustration, transaction data may also include an image, bar code and/or other identifier of the products or services purchased. An embodiment of the present invention may also provide inventory reconciliation to verify that authorized goods and/or services were purchased using targeted benefits. Transaction data may also include information about the merchant, including the identities of the check-out clerks who interfaced with the participant. For example, price verification may be applied where a system of an embodiment of the present invention may verify the average price of a certain product for a particular geographical location. In this example, the verification feature may confirm that milk is less than $4 per gallon in a certain city and more than $5 per gallon in another city. Other examples may include transaction dates and times, transaction geo-coded information and/or other data.

Geographical Data Module 216 may associate geographical information with the participant, merchant and other surrounding merchants and/or points of interest. For example, a feature of the system is directed to applying geographical data to the data-mining tool. Exemplary data elements may include: geographical location of the participant's address (e.g., latitude/longitude coordinates of participant's address); geographical location of the merchant (e.g., latitude/longitude coordinates of merchant address); and distance of a transaction (e.g., driving distance between where the participant lives and where the participant shopped). Other locations may include family member's home, school, employment, etc. Also, a regular commute or course of travel may be considered.

For example, using the geographical information, the system of the present invention may identify every participant that shopped over X miles from their home. An embodiment of the present invention may identify transactions and/or participants who travel an unusually long distance or take a difficult or unusual route to seek redemption at a particular merchant. This geographical information—which may be combined with other data—may identify potentially fraudulent activities. The groups of transactions and participants may be further analyzed to determine whether transaction amounts were for an event amount, which may be indicative of a redemption for cash. Other information may involve how many participating retailers were passed on route to the redeeming merchant. Other factors may include consideration of the type of merchant. An embodiment of the present invention may recognize that certain types of merchants, e.g., small convenient store, may be more prone to fraud. Also an embodiment of the present invention may recognize a particular check-out clerk at a merchant. This feature may be particularly useful for identifying fraud at a major retailer. For example, if a check-out clerk has checked out a particular participant each of the last 10 times, this may raise suspicion and warrant additional analysis and/or monitoring.

Using various combinations of data, an embodiment of the present invention may generate a report or profile for the participant, merchant, group of participants (e.g., by age, location, demographic), group of merchants (e.g., by size, location, type), etc. The system may also identify trends, predict next steps and learn patterns from known fraud as well as false positives. This is particularly useful when learning new tactics from fraudsters who are constantly trying to outsmart the current system.

Program Module 218 may identify factors associated with targeted benefits programs. For example, a targeted benefit program may enable an authorized participant the ability to purchase (fully or partially) a service or good using a benefit. The benefit may be purchased using an authorized card product, e.g., debit card. The debit card may be authorized to a qualifying individual. Other purchase mechanisms may include a token, an identifier, RFID, mobile phone, an account associated with another card product, etc. For example, a targeted benefit entity may identify an authorized program and associated restrictions. According to the SNAP example, an entity may identify the SNAP program and identify what types of purchases are authorized. Other programs may include other restrictions, e.g., amount, merchant, effective time period, and authorized purchases and services, etc. Targeted benefit programs may also specify qualifications to participate. For example, a certain income level, age, status, for example, may be required. Another example may include transportation vouchers where users may be restricted to using vouchers for specific type of public transportation, e.g., bus, taxi, subway, etc. Other targeted benefits may include medical programs for medical transactions. Another example may include purchases for a healthcare spending fund where certain health related purchases may be purchased from the fund.

Data Linking Engine 220 may be applied to participant data, merchant data and/or transaction data to monitor activity, identify trends and generate predictions. Other sources of data may be considered. An embodiment of the present invention may use a data-mining tool to isolate possible participants and merchants who may be participating in the trafficking. An embodiment of the present invention may include dynamic data linking that applies one or more filters and then combine the filtered elements to provide more meaningful and manageable result.

For example, an embodiment of the present invention may apply an initial filter that captures transactions that occurred over 20 miles from the participant's residence, school and/or employment. From this initial result, another filter may identify transactions that occurred at a convenient store (as opposed to a major retailer). From this set of results, another filter may identify which transactions involved redeeming 100% of the participant's issued benefits. Next from these narrowed results, an embodiment of the present invention may determine which transaction were for an even dollar amount, e.g., $100, $50, etc. This is merely an exemplary scenario, additional filters may be applied in any order. In addition, less filters may be applied. The number and type of filters may be dependent on how many results are obtained from each stage.

Other forms of narrowing mechanisms may be applied. For example, a reverse filter may be applied to exclude potential fraud results. An initial filter that identifies participants that travel more than 20 miles to redeem at a specific merchant may be applied. These results may be further analyzed to identify the transactions that occur within 5 miles of the participant's work, recreation, gym, school, daycare and/or other proper location. This filter may provide some justification for the long travel distance. Accordingly, those transactions may then be excluded from the potential fraud group.

An embodiment of the present invention may continuously learn from known frauds and the behavior leading up to fraudulent events. Additional filters may be generated based on the known fraud that would likely lead to fraud. Also, once a known fraud is determined, an embodiment of the present invention may identify associated or affiliated participants. Other connections may be made, such as similar area, same employment, same gym membership, same or similar ethnicity, and/or other areas of commonality.

Filters may be applied to merchant specific factors. For example, if a particular merchant is closing more than $50,000 worth of benefits while a national retailer is closing about $2000 each week, the high amount of redemptions may be indicative of potential fraud. Here, an embodiment of the present invention may start with customers of this particular merchant and apply filters to narrow the potential fraud list. A redemption above a certain threshold may indicate that the participant is receiving cash for the benefits. For example, a participant who is redeeming over $200 of goods at a small convenient store at a gas station may be involved in fraudulent behavior, because this type of amount is typically spent at large warehouse merchant. Typical transactions at small convenient stores may be around about $20, not $200.

Also, after one merchant is caught, other merchants may change their behavior to avoid getting caught. An embodiment of the present invention may apply filters to identify changes in behavior by merchants, participants, intermediaries and/or other participants. For example, filters may be applied from a certain time period to detect a change in merchant and/or participant behavior. In a similar manner, fraudulent participants may visit multiple merchants who are engaging in fraud. By identifying a fraudster (known or potential), additional players may be efficiently identified and addressed.

An embodiment of the present invention may be directed to monitoring participants to identify suspicious behavior. For example, a cardholder may sell a card (or other payment instrument) and the associated PIN or other identifier. This cardholder may then request a new card. A next step towards fraud may involve selling the card number and the associated PIN. In this regard, an embodiment of the present invention may closely monitor this cardholder and associated activity. A participant with frequent PIN changes may be selling the card number (or other identifier) and associated PINs. Using this example, one or more filters that identifies PIN changes (e.g., number of PIN changes, circumstances (lost or stolen), time period between PIN changes, next transaction of lost card, etc.) may be applied to identify potential fraud and closely monitor this group of participants.

An embodiment of the present invention may monitor geographical location of the card and/or transaction activity. For example, if the card has been compromised, multiple transactions within long distances may be occurring. In this exemplary scenario, an embodiment of the present invention may identify that the same card was used in California, Michigan and Texas all in the same day. An embodiment of the present invention may confirm that none of the transactions took place in an airport. This type of activity may be indicative of a participant selling card numbers and PINs.

Response Module 222 may identify and/or apply a recommended action based on the analysis performed by an embodiment of the present invention. Based on the potential activity detected, an appropriate response may be identified and applied. Generally, it may not be desired to completely refuse redemption for a potential fraud. Instead, a less severe response may be applied. For example, a participant may be diverted to a known good merchant. In this scenario, the benefit may be only valid at known retailers and no longer redeemable at all participating merchants, in particular at suspect merchants. In addition, benefits may be effective at merchants with a confirmation mechanism, such as inventory reconciliation, photo feature, etc. A confirmation mechanism at such merchants may be enough to deter fraudsters. Other responses may include requiring pre-authorization from the participant, where a caseworker or other representative may contact the identified merchant to confirm proper redemption. An embodiment of the present invention may be directed to identifying and applying tiered responses for suspect participants/merchants/transactions. Such responses may include reduce amount eligible; reduce eligible merchants, reduce frequency of use, receive phone call from case worker, etc.

Reports/Output Module 224 may generate various forms of reports to identify potential fraud, potentially fraudulent players (e.g., card holder, participant and/or merchant, intermediary, etc.). Reports may include visuals, including bar graphs, pie charts, animations, interactive features, etc. A system of the invention may allow users to select a report with a number of data elements and conditions to yield an output of data that may be further investigated. An embodiment of the present invention may also include dynamic data linking that applies filters and then combines the filtered elements to provide meaningful results.

According to another example, a user may enter a narrative search. An exemplary search may include "give me all transactions from convenient stores in X region for an even dollar amount in the last month." An embodiment of the present invention may parse the narrative and automatically generate an appropriate series of filters. The filters may then be automatically applied to generate results. Also, the system may present a series of suggested filters based on the narrative, where the user may select, modify and/or remove one or more suggested filters. Other variations may be applied.

Investigation Module 226 may provide an interface to one or more investigative entities. An embodiment of the present invention provides for a more thorough investigation that will allow for better linking of accounts to ensure high risk accounts are properly identified and appropriate actions are taken (e.g., SARs are filed correctly). Moreover, earlier detection may lead to lower losses and damages. Another benefit provides a coordinated effort for recovery across multiple departments, including Authorizations, Retail, Payments, etc.

External/Social Media Module 228 may pull participant specific information from various public sources, including social media sites, data aggregators, image aggregators, networking websites, as well as other sources of data associated with participants, merchants, investigator sources, etc.

Figure 3:
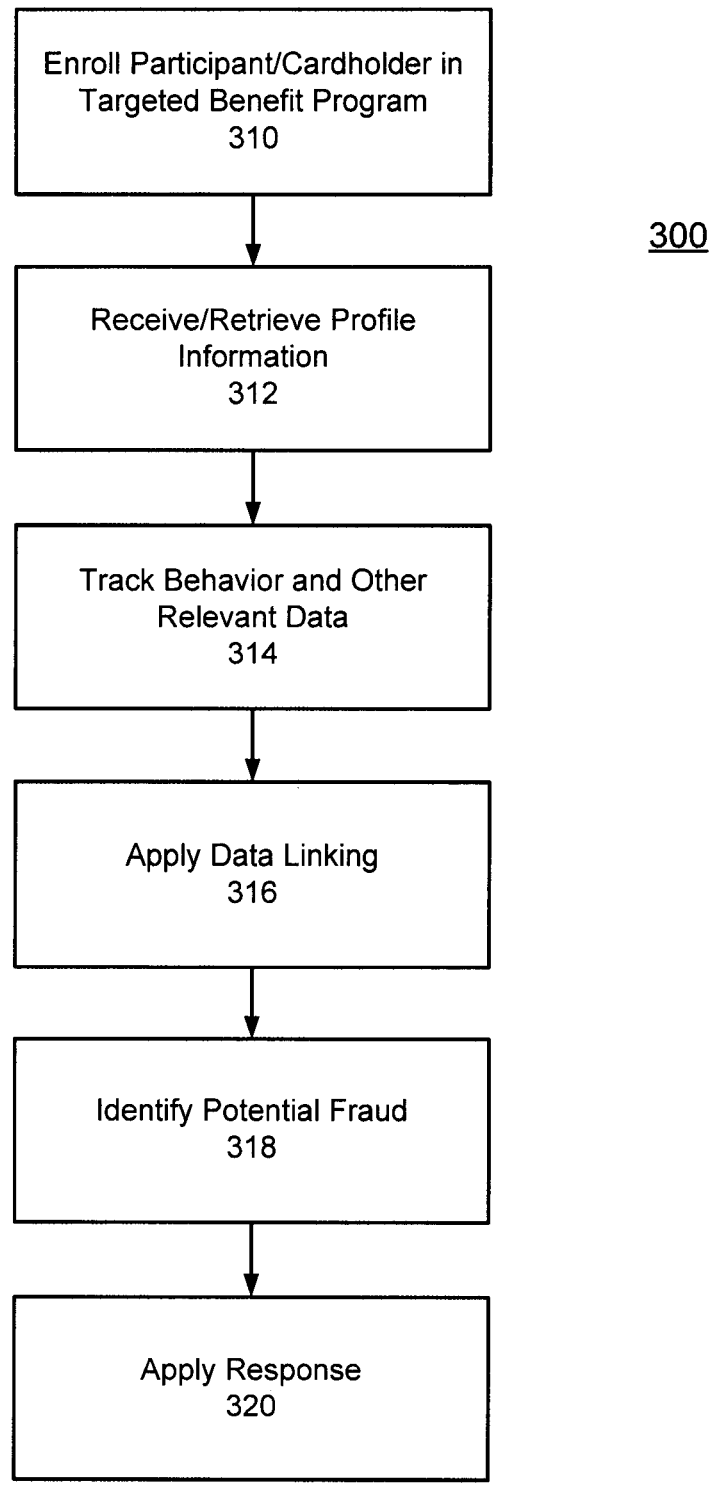
FIG. 3 is an exemplary flowchart illustrating a method for monitoring participant activity for fraud analysis, according to an embodiment of the present invention.

FIG. 3 is an exemplary flowchart illustrating a method for monitoring participant activity for fraud analysis, according to an embodiment of the present invention. At step 310, a participant (e.g., cardholder) may receive authorization to join a targeted benefit program. At step 312, participant profile may be generated or retrieved if one is already set up. At step 314, participant behavior may be tracked. At step 316, data linking may be applied. At step 318, it may be determined whether potential fraud is detected. At step 320, an appropriate response may be applied. The order illustrated in FIG. 3 is merely exemplary. For example, step 316 may be performed before step 314. While the process of FIG. 3 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 310, a participant (e.g., cardholder) may receive authorization to join a targeted benefit program. Targeted benefit programs may place qualifications on participants as well as restrictions on types of purchases. For example, targeted benefit programs may have certain qualifications for participation, such as income level, status, age, demographic, need, medical condition, etc. Other programs may have no conditions for enrollment. Targeted benefit programs may include restrictions on eligible purchases, e.g., a class of products (e.g., groceries, etc.), types of services (e.g., medical services, public transportation, etc.), and certain merchants (e.g., redemption only at merchant X or class of merchants, etc.). When the participant is approved for enrollment, the participant may receive a payment instrument, such as a debit card, identifier, token, RFID, mobile device, application for download on a mobile device, authorization on an existing account, etc. The payment instrument may be associated with the eligible participant. In some cases, the eligible participant may authorize family members and/or others to make purchases with the payment instrument.

At step 312, participant profile may be generated or retrieved if one is already set up. Profile data may include demographic data, transactional data, behavior data as well as other data which may be gleaned from geographical data. The participant may also provide additional information. Other sources may include social medial networks, public forums, data aggregators, etc.

At step 314, participant behavior may be tracked. An embodiment of the present invention may identify purchase behavior including merchants, purchase preferences, changes in status (e.g., employment, etc.), events, etc. For example, a participant's transaction data may tracked and analyzed to identify insights into the participant's purchase behavior. Geographical data may be tracked from the customer's transactions (e.g., travel between home address and merchant location, etc.). Additional data may be tracked by a mobile device associated with the participant. Other points of interest may include public transportation (e.g., swipe of a subway card, passing of a toll, exit out or entrance to a parking garage, etc.). Any establishment that may be capable of detecting geographical data and/or related data may be used to track the participant's behavior, transactions, travel, etc.

At step 316, data linking may be applied. According to an exemplary embodiment, data linking may involve applying a plurality of filters to identify a group of potentially fraudulent transactions.

At step 318, it may be determined whether potential fraud is detected. The output may be displayed on an interface, such as a report and/or other graphic. For example, a system user may access the interface, via a network or other connection, to view and/or otherwise interface with the output. The interface may be provided on a user device, such as a computer, mobile device, phone, and/or any device that displays an interface. According to another example, a feature of an embodiment of the present invention may include transmitting the output as a file (e.g., batch file) to one or more clients and/or other recipients. This file may be transmitted on a periodic basis (e.g., every work day at 5:00 pm, once a week, etc.) and/or at a request.

At step 320, an appropriate response may be applied based on the potential activity detected. There may be several possible responses. For example, an embodiment of the present invention may consider relevant facts and present a top response, with one or more alternative response for the user to consider. One or more rules may be identified and applied. For example, certain data points may hold more significance over others and thereby warrant a more aggressive response. Also, other filters may result in less likely fraud, where an internal note, letter and/or communication to a caseworker (or other representative), cardholder, merchant and/or participant may be sufficient. A less severe response may be applied to other results. For example, a participant may be diverted to a known good merchant. In this scenario, the benefit may be only valid at known retailers and no longer redeemable at all participating merchants, in particular at suspect merchants. In addition, benefits may be effective at merchants with a confirmation mechanism, such as inventory reconciliation, photo feature, etc. Other responses may include requiring pre-authorization from the participant, where a caseworker or other representative may contact the identified merchant to confirm proper redemption. An embodiment of the present invention may be directed to identifying and applying tiered responses for suspect participants/merchants/transactions. Such responses may include reduce amount eligible; reduce eligible merchants, reduce frequency of use, receive phone call from case worker, etc. An embodiment of the present invention may also provide user specific reports. Such reports may include visuals, including bar graphs, pie charts, animations, interactive features, etc.

Figure 4:
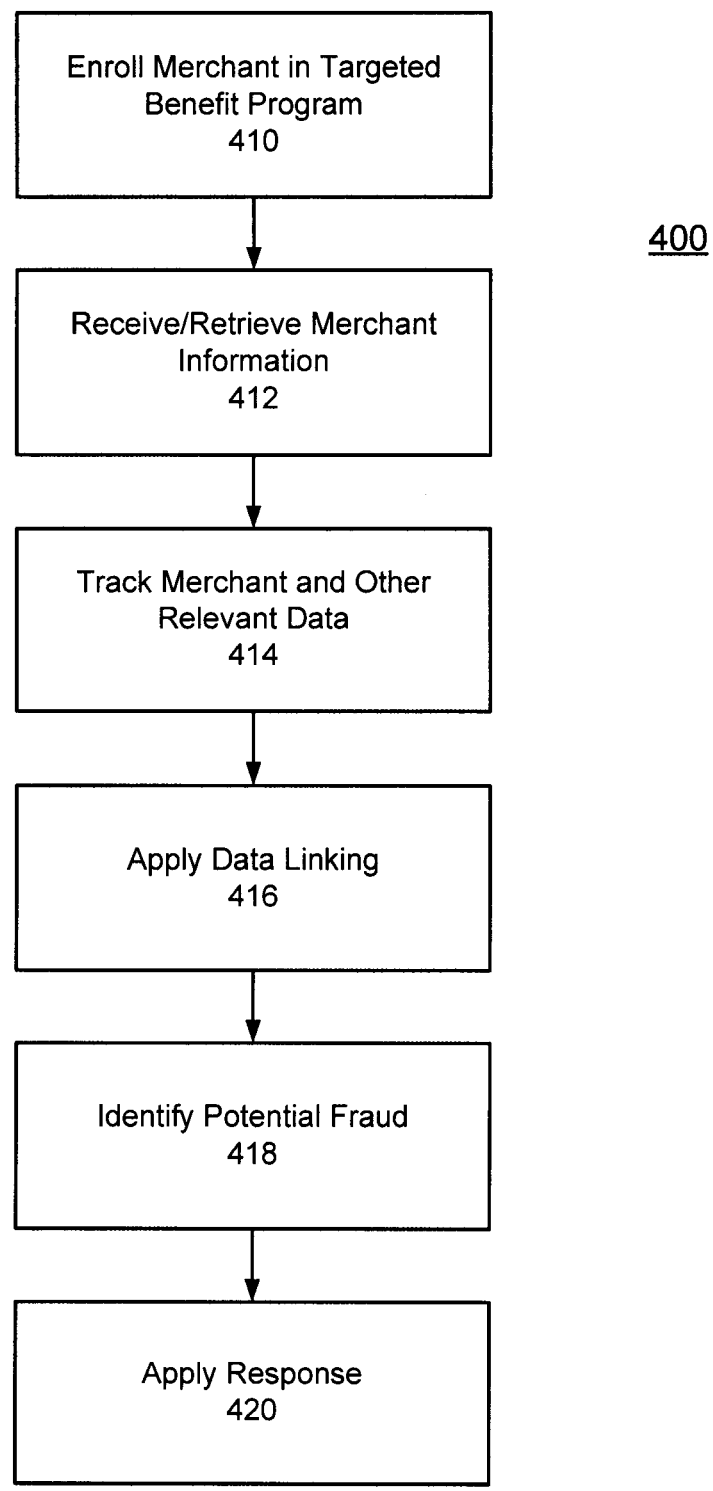
FIG. 4 is an exemplary flowchart illustrating a method for monitoring merchant activity for fraud analysis, according to an embodiment of the present invention.

FIG. 4 is an exemplary flowchart illustrating a method for monitoring merchant activity for fraud analysis, according to an embodiment of the present invention, according to an embodiment of the present invention. At step 410, an embodiment of the present invention may activate a merchant in a targeted benefit program. At step 412, merchant profile information may be received. At step 414, transaction data at the merchant may be tracked and monitored. At step 416, data linking may be applied. At step 418, a determination regarding potential fraud may be made. If potential fraud is determined, an appropriate response may be applied at step 422. While the process of FIG. 4 illustrates certain steps performed in a particular order, it should be understood that the embodiments of the present invention may be practiced by adding one or more steps to the processes, omitting steps within the processes and/or altering the order in which one or more steps are performed. For example, step 416 may be performed before step 414. These steps will be described in greater detail below.

At step 410, an embodiment of the present invention may activate a merchant in a targeted benefit program. Merchants may include small convenient stores, kiosks, local stores, national retailers, specialty stores, grocery stores, gas stations, etc. Also, online merchants may also participate in the various embodiments of the present invention.

At step 412, merchant profile information may be received. Merchant profile information may include type of goods sold, number of transactions, number of redemptions, customers, customer type, etc.

At step 414, transaction data at the merchant may be tracked and monitored. For example, an embodiment of the present invention may consider promotions and sales offered by merchants. For example, the system of the present invention that may recognize such events as being relevant in attracting customers to stores that may be out of their way. In such instances, some customers may legitimately travel 20 miles to redeem sales and promotions. An embodiment of the present invention may also identify customer contacts with store clerks, such as check-out clerks. This may be useful in identifying a pattern or a potential fraudster. For example, if a participant is being checked out by the same check-out clerk in the last 20 visits, this may be an event worth investigating. Other data may include tracking peer merchants.

At step 416, data linking may be applied. According to an exemplary embodiment, data linking may involve applying a plurality of filters to identify a group of potentially fraudulent transactions. At step 418, a determination regarding potential fraud may be made. If potential fraud is determined, an appropriate response may be applied at step 420.

Figure 5:
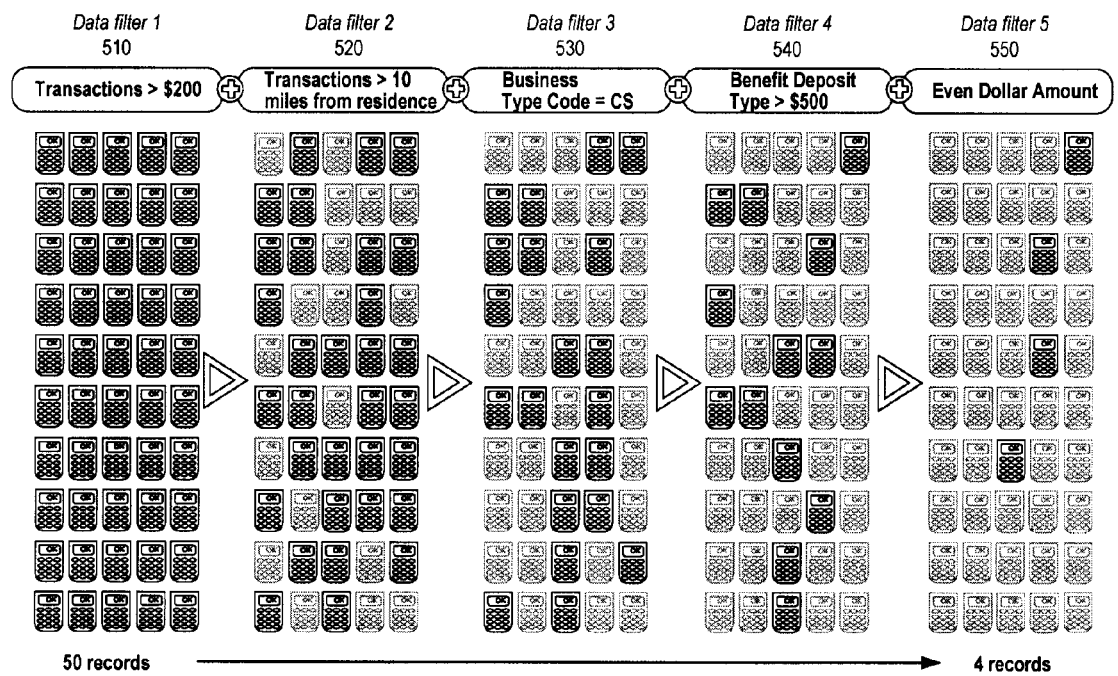
FIG. 5 is an illustration of exemplary data linking, according to an embodiment of the present invention.

FIG. 5 is an illustration of exemplary data linking, according to an embodiment of the present invention. An initial data filter may be applied, as shown by 510. The first data filter identifies transactions that are over $200. In this example, the first filter results in 50 records. The next data filter may be applied at 520. The second data filter identifies transactions that are more than 10 miles from the participant's residence. The next filter is shown at 530. The third data filter identifies merchants that fit a type code. Here, CS represents convenient stores. The next filter is illustrated at 540. The fourth filter identifies benefit deposits greater than $500. Finally, the last filter, shown by 550, identifies transactions having an even dollar amount. The results of the exemplary dynamic linking includes 4 records. The scenario in FIG. 5 is merely exemplary, other filters in various sequences may be applied.

An embodiment of the present invention may also provide a mechanism for addressing fraud committed and/or aided by system users and/or other internal users. For each interaction, a performing user identifier field may identify the internal user that interacted with a participant or cardholder interaction. The performing user identifier may also identify whether the interaction was with a representative, Interactive Voice Response (IVR) and/or combination. A filter that identifies a performing user identifier may be applied to identify interactions with a particular system user, where this information may be used to identify internal fraudulent behavior. For example, an embodiment of the present invention may identify a particular system user who issued replacement PIN numbers to five individuals that were later involved in fraudulent activities. According to another example, an embodiment may recognize commonalities and present them to the user via the interface. Thus, a user may apply a filter by identifier a performing user identifier. Also, an embodiment of the present invention may identify common factors in the fraud results and present a common performing user identifier (or other factor). The system may also indicate a percentage and/or ranking of identified commonalities, such as 90% of the fraud had the same performing user identifier. Other commonalities and/or similarities may be analyzed and displayed.

While the exemplary embodiments illustrated herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Data and information maintained by Processor 110 may be stored and cataloged in Database 140 which may comprise or interface with a searchable database. Database 140 may comprise, include or interface to a relational database. Other databases, such as a query format database, a Standard Query Language (SQL) format database, a storage area network (SAN), or another similar data storage device, query format, platform or resource may be used. Database 140 may comprise a single database or a collection of databases, dedicated or otherwise. In one embodiment, Database 140 may store or cooperate with other databases to store the various data and information described herein. In some embodiments, Database 140 may comprise a file management system, program or application for storing and maintaining data and information used or generated by the various features and functions of the systems and methods described herein. In some embodiments, Database 140 may store, maintain and permit access to participant information, transaction information, account information, and general information used to process transactions as described herein. In some embodiments, Database 140 is connected directly to Processor 110, which, in some embodiments, it is accessible through a network, such as communication network, e.g., 122, 124, 126 illustrated in FIG. 1, for example.

Communications network, e.g., 122, 124, 126, may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services. Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection.

Communications network, e.g., 122, 124, 126, may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 107 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network, e.g., 122, 124, 126, may comprise a satellite communications network, such as a direct broadcast communication system (DBS) having the requisite number of dishes, satellites and transmitter/receiver boxes, for example. Communications network, e.g., 122, 124, 126, may also comprise a telephone communications network, such as the Public Switched Telephone Network (PSTN). In another embodiment, communication network 120 may comprise a Personal Branch Exchange (PBX), which may further connect to the PSTN.

In some embodiments, Processor 110 may include any terminal (e.g., a typical home or personal computer system, telephone, personal digital assistant (PDA) or other like device) whereby a user may interact with a network, such as communications network, e.g., 122, 124, 126, for example, that is responsible for transmitting and delivering data and information used by the various systems and methods described herein. Processor 110 may include, for instance, a personal or laptop computer, a telephone, or PDA. Processor 110 may include a microprocessor, a microcontroller or other general or special purpose device operating under programmed control. Processor 110 may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. Processor 110 may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). Processor 110 may also include a network-enabled appliance, a browser-equipped or other network-enabled cellular telephone, or another TCP/IP client or other device.

As described above, FIG. 1 shows embodiments of a system of the invention. The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example. As described herein, a module performing functionality may comprise a processor and vice-versa.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; e.g., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

The embodiments of the present inventions are not to be limited in scope by the specific embodiments described herein. For example, although many of the embodiments disclosed herein have been described with reference to identifying fraudulent activities, the principles herein are equally applicable to other applications. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

The invention claimed is:

1. An automated computer implemented method identifying potential fraud with targeted benefits, wherein the method is executed by a programmed computer processor which communicates with a user via a network, the method comprising the steps of:

receiving, using a programmed computer processor, participant data associated with a participant of a targeted benefit program wherein the participant data comprises geographical data associated with the participant and a participating merchant wherein the geographical data comprises travel distance between an address associated with the participant and the participating merchant;

applying, using a programmed computer processor, data linking to the participant data where a plurality of filters are applied to the participant data to identify potential fraud; and providing an output, via an interface, comprising a recommended response to the identified potential fraud.

2. The method of claim 1, wherein the participant data further comprises transaction data from one or more merchants.

3. An automated computer implemented method identifying potential fraud with targeted benefits, wherein the method is executed by a programmed computer processor which communicates with a user via a network, the method comprising the steps of:

receiving, using a programmed computer processor, participant data associated with a participant of a targeted benefit program wherein the participant data comprises geographical data associated with the participant and a participating merchant wherein the geographical data comprises travel distance between an address associated with the participant and the participating merchant;

filtering, using a programmed computer processor, data linking to the participant data where a plurality of filters process the participant data to identify potential fraud; and providing an output, via an interface, comprising a recommended response to the identified potential fraud wherein the output comprises a user defined report.

4. The method of claim 1, wherein the participant data is retrieved from a card product issued to the participant.

5. The method of claim 1, wherein the plurality of filters comprise a combination of filters associated with participant data, merchant data and transaction data.

6. The method of claim 1, wherein the participant data comprises reconciliation data to confirm purchases made by the participant.

7. An automated computer implemented method for identifying potential fraud with targeted benefits, wherein the method is executed by a programmed computer processor which communicates with a user via a network, the method comprising the steps of:

receiving, using a programmed computer processor, participant data associated with a participant of a targeted benefit program wherein the participant data comprises geographical data associated with the participant and a participating merchant, wherein the geographical data comprises travel distance between an address associated with the participant and the participating merchant;

filtering, using a programmed computer processor, data linking to the participant data where a plurality of filters process the participant data to identify potential fraud; and providing an output, via an interface, comprising a recommended response to the identified potential fraud, wherein the targeted benefit program restricts redemptions to a class of eligible purchases at one or more eligible merchants, wherein the targeted benefit program restricts redemptions to a class of eligible purchases at one or more eligible merchants.

8. The method of claim 1, wherein the targeted benefit program is directed to eligible services.

9. The method of claim 1, wherein the participant comprises one or more of a cardholder and a merchant.

10. The method of claim 1, wherein one filter of the plurality of filters comprises a performing user identifier.

11. A computer readable media comprising code to perform the acts of the method of claim 1.

12. An automated computer implemented system identifying potential fraud with targeted benefits, wherein the system comprises a programmed computer processor which communicates with a user via a network, the system comprising:

an input, comprising a programmed computer processor, configured to receive participant data associated with a participant of a targeted benefit program wherein the participant data comprises geographical data associated with the participant and a participating merchant wherein the geographical data comprises travel distance between an address associated with the participant and the participating merchant;

a data linking engine, comprising a programmed computer processor, configured to apply data linking to the participant data where a plurality of filters are applied to the participant data to identify potential fraud; and an output, comprising a computer interface, configured to provide an output comprising a recommended response to the identified potential fraud.

13. The system of claim 12, wherein the participant data further comprises transaction data from one or more merchants.

14. An automated computer implemented system for identifying potential fraud with targeted benefits, wherein the system comprises a programmed computer processor which communicates with a user via a network, the system comprising:

an input, comprising a programmed computer processor, configured to receive participant data associated with a participant of a targeted benefit program wherein the participant data comprises geographical data associated with the participant and a participating merchant;

wherein the geographical data comprises travel distance between an address associated with the participant and the participating merchant;

a data linking engine, comprising a programmed computer processor, configured to connect data linking to the participant data where a plurality of filters process the participant data to identify potential fraud; and an output, comprising a computer interface, configured to provide an output comprising a recommended response to the identified potential fraud, wherein the output comprises a user defined report.

15. The system of claim 12, wherein the participant data is retrieved from a card product issued to the participant.

16. The system of claim 12, wherein the plurality of filters comprise a combination of filters associated with participant data, merchant data and transaction data.

17. The system of claim 12, wherein the participant data comprises reconciliation data to confirm purchases made by the participant.

18. An automated computer implemented system for identifying potential fraud with targeted benefits, wherein the system comprises a programmed computer processor which communicates with a user via a network, the system comprising:

an input, comprising a programmed computer processor, configured to receive participant data associated with a participant of a targeted benefit program wherein the participant data comprises geographical data associated with the participant and a participating merchant;

wherein the geographical data comprises travel distance between an address associated with the participant and the participating merchant;

a data linking engine, comprising a programmed computer processor, configured to connect data linking to the participant data where a plurality of filters filter the participant data to identify potential fraud; and an output, comprising a computer interface, configured to provide an output comprising a recommended response to the identified potential fraud, wherein the targeted benefit program restricts redemptions to a class of eligible purchases at one or more eligible merchants.

19. The system of claim 12, wherein the targeted benefit program is directed to eligible services.

20. The system of claim 12, wherein the participant comprises one or more of a cardholder and a merchant.

21. The system of claim 12, wherein one filter of the plurality of filters comprises a performing user identifier.

22. An automated computer implemented method for identifying potential fraud with targeted benefits, wherein the method is executed by a programmed computer processor which communicates with a user via a network, the method comprising the steps of:

receiving, using a programmed computer processor, participant data associated with a participant of a targeted benefit program wherein the participant data comprises geographical data associated with the participant and a participating merchant, wherein the targeted benefit program restricts redemptions to a class of eligible purchases and services at one or more eligible merchants and wherein the participant data further comprises transaction data from one or more merchants, and the geographical data comprises travel distance between an address associated with the participant and the participating merchant;

applying, using a programmed computer processor, data linking to the participant data where a plurality of filters are applied to the participant data to identify potential fraud, wherein the plurality of filters comprise a combination of filters associated with participant data, merchant data and transaction data; and providing an output, via an interface, comprising a recommended response to the identified potential fraud.

\* \* \* \* \*